United States Patent
Smith

(10) Patent No.: US 6,547,894 B1
(45) Date of Patent: Apr. 15, 2003

(54) METHOD OF FORMING A STABILIZER BAR

(76) Inventor: James B. Smith, 38534 Brookfield Pl., Wayne, MI (US) 48184

( * ) Notice: Subject to any disclaimer, the term of this patent is extended or adjusted under 35 U.S.C. 154(b) by 0 days.

(21) Appl. No.: 09/997,908

(22) Filed: Nov. 30, 2001

(51) Int. Cl.$^7$ ................................ B60G 11/18
(52) U.S. Cl. ................. 148/521; 148/591; 148/593; 228/248.1
(58) Field of Search ................. 148/521, 591, 148/593; 228/200, 245, 248.1

(56) References Cited

U.S. PATENT DOCUMENTS

| | | |
|---|---|---|
| 3,632,243 A | 1/1972 | Mott |
| 3,844,019 A | 10/1974 | Shwayder et al. |
| 4,836,516 A | 6/1989 | Wycech |
| 4,892,498 A | 1/1990 | Gradl et al. |
| 4,908,930 A | 3/1990 | Wycech |
| 5,192,016 A * | 3/1993 | Araki et al. ............. 228/147 |
| 5,305,942 A | 4/1994 | Brunken |
| 5,491,996 A | 2/1996 | Baarman et al. |
| 5,588,209 A | 12/1996 | Fisher et al. |
| 6,233,826 B1 | 5/2001 | Wycech |

* cited by examiner

Primary Examiner—George Wyszomierski
(74) Attorney, Agent, or Firm—Brooks & Kushman P.C.

(57) ABSTRACT

A method of making a stabilizer bar from a tubular blank to which a mixture of an adhesive and powdered metal is applied to the inside surface of opposite ends of the tube. The adhesive is cured and then the fuseweld powder is placed in an oven to melt the fuseweld powder. The ends are swagged to shape flat tubes ends that are trimmed and pierced to form a fastener eyelet in each end. The stabilizer bar is then heated for hot working to form the bends along the length of the bar. After forming to shape, the stabilizer bar is quenched and annealed.

11 Claims, 2 Drawing Sheets

METHOD OF FORMING A STABILIZER BAR

BACKGROUND OF THE INVENTION

1. Field of the Invention

The present invention relates to a method of making a stabilizer bar for a vehicle and to the stabilizer bar made according to the method.

2. Background Art

A stabilizer bar is a vehicle suspension component that forms part of the front suspension. A stabilizing bar is a hollow rigid bar that interconnects front suspension elements with the frame of the vehicle to improve stability.

A stabilizer bar has eyelets on opposite ends for receiving fasteners for connecting the bar to the suspension for the right wheel and left wheel. Stabilizer bars are formed from hollow tubes in a hot forming process. After forming, they are quenched in an oil bath or aqueous bath and then are annealed. One problem with prior art stabilizer bar manufacturing techniques is that if the stabilizer bar end is not completely closed prior to quenching, the quenching oil or aqueous solution may be drawn into the tube due to a vacuum created when the hot tube is cooled and becomes trapped within the tube. This can result in what appears to be an oil leak if the quench fluid later drips from the stabilizer bar. This can lead to unnecessary warranty costs if a customer believes that they have an oil leak but service technicians are unable to identify the source of the oil since the stabilizer bar is intended to be a hollow tube that does not ordinarily contain oil or other fluid.

Another problem encountered in the manufacture of stabilizer bars is that if they have ends formed by squeezing a hollow tube to form a closed end it is difficult to maintain alignment of the top and bottom wall holes after forming and thermal treatment. If two holes are pierced through the two walls of a tube they may initially be aligned but as the tube is subsequently bent, quenched and annealed the two holes may become misaligned.

One solution to the above problems has been to fill the ends of the tube used to manufacture the stabilizer bar with a solid metal cylindrical piece, or filler slug, that extends into the tube from both ends approximately 1 to 2 inches. The ends of the tube are then spin welded to the filler slug to provide a tube having solid ends that can be formed and trimmed to form the fastener eyelets. A stabilizer bar having spin welded tube end fillers can be quenched without any risk of drawing the quench fluid into the hollow tubular portion of the stabilizer bar. The problem of misalignment of the two holes after forming is also solved by welding the cylindrical piece to the tube end is also avoided. However, this approach adds to the cost of materials required to make the stabilizer bar and also adds manufacturing operations that make it more expensive to produce a stabilizer bar.

There is a need for a method of making stabilizer bars having closed ends that do not draw quench fluid into the stabilizer bar during the manufacturing process that can result in difficult to identify oil leaks in a vehicle. More generally, there is a need for an improved manufacturing process for manufacturing parts from tubes having closed ends that do not distort the alignment of the holes in the ends when the tube is subsequently hot formed and quenched. Tubes fabricated in a hot forming process followed by a quenching operation may be used in applications other than the manufacture of stabilizer bars. Other such tube fabricating processes can benefit from a simple and inexpensive process for closing and sealing tube ends.

The above problems and needs are addressed by the invention as summarized below.

SUMMARY OF THE INVENTION

According to one aspect of the present invention, a method of making a stabilizer bar for a vehicle is provided that comprises initially providing a steel tubular member having an inner diameter and two open ends. A mixture of an adhesive and a fuseweld powder is applied to the inner diameter of both ends of the tubular member. The adhesive may be cured if applied in a wet state and the tubular member is heated to cause the fuseweld powder to melt. The two ends of the tubular member are formed by flattening to form two flat ends while the fuseweld powder is heated to at least a temperature wherein the fuseweld powder is in a plastic state. The method is completed by trimming each of the two ends to form an eyelet for a fastener.

According to other aspects of the invention, the fuseweld powder may be a powdered metal composition such as a mixture of powdered metal such as chromium, nickel, boron, silicon and molybdenum. Other additives may include small amounts of cobalt, carbon, iron, or tungsten that may be used to change the final product properties such as the required ductility. The step of applying the mixture adhesive and fuseweld powder may be performed by either brushing or spraying the mixture to apply to the inner diameter of the two ends of the tubular member. Alternatively, if the mixture is applied just prior to melting and forming other methods of applying the mixture may be used including inserting in a glass or silicone capsule containing the fuseweld powder that melts within the tube end and can function as a flux. The mixture may also be applied just prior to further processing by a metered injection of a dry powder, thick slurry or in a gel form. The mixture could also be applied by a thermal spray process and then subsequently remelted. The step of forming the two ends to form two flat ends may further comprise swaging each of the two ends together with the fuseweld powder sealing the two ends of the tubular member.

According to another aspect of the invention, the method may also include reheating the tubular member and bending the tubular member along its length while heated. After bending, the tubular member is quenched in a quenching fluid and then annealed. The tubular member may be quenched while the fuseweld powder seals the two ends of the tubular member to prevent the quenching fluid from being drawn into the tubular member.

According to another aspect of the invention, a stabilizer bar is provided for a vehicle that comprises a tubular member having two ends and an opening extending between the two ends. Each of the two ends is provided with a mixture of an adhesive and a fuseweld powder on their inner diameters. Each of the ends have flat portions that are bonded together by the fuseweld powder to form a seal. The stabilizer bar further includes openings for receiving a fastener provided on each of the ends of the stabilizer bar. Bonding the ends prevents the openings in the stabilizer bar ends from becoming misaligned after forming and heat treating. The fuseweld powder sealing the ends of the stabilizer bar may be a powdered metal composition including chromium, nickel, boron, silicon and molybdenum. Other additives may include small amounts of cobalt, carbon, iron, or tungsten. The fuseweld powder bonds the two ends of the tubular member and the boron or silicon may function as a flux agent that facilitates bonding to the tubular member.

The aspects of the invention summarized above and additional features of the invention are more specifically described with reference to the attached drawings and following detailed description thereof.

DETAILED DESCRIPTION OF THE PREFERRED EMBODIMENT(S)

Figure 1:
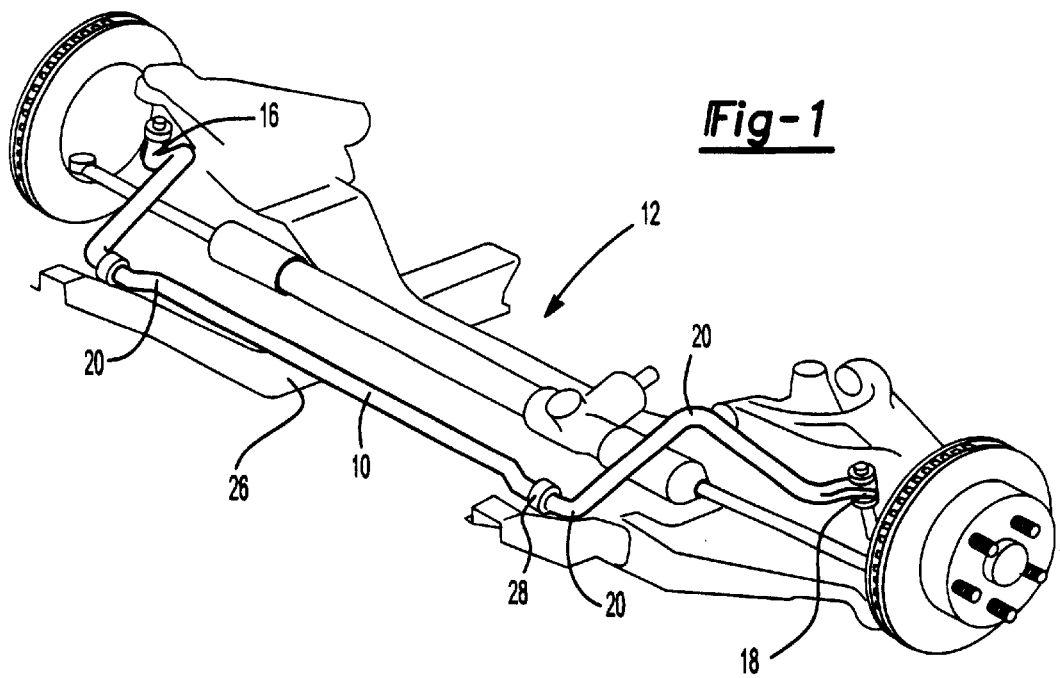
FIG. 1 is a front perspective view of a stabilizer bar shown as it is incorporated in a front suspension of a vehicle.

Referring now to FIG. 1, stabilizer bar 10 is shown as part of a front end suspension generally indicated by reference numeral 12. The stabilizer bar 10 includes a right end 16 and left end 18. The terms "right" and "left" as used herein correspond to relative vehicle positions from a driver's perspective wherein the driver of the vehicle is on the left side of the vehicle. The stabilizer bar 10 includes a series of bends 20 at locations dictated by the front suspension design. The stabilizer bar 10 is secured to the frame 26 by means of anchors 28 that journal the stabilizer bar 10 for limited arcuate movement.

Figure 2:
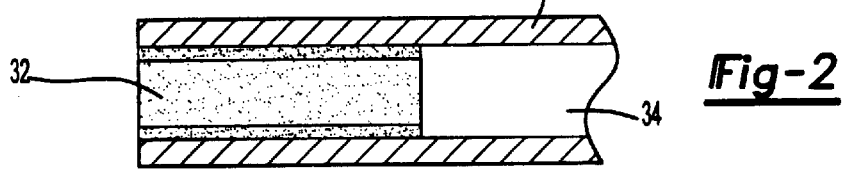
FIG. 2 is a fragmentary cross-sectional view of an end of a tube used to manufacture a stabilizer bar that has been coated on its inner diameter with a mixture of adhesive and a fuseweld powder.

Referring now to FIG. 2, one end of a tube 30 from which the stabilizer bar 10 is to be formed is shown with a mixture of adhesive and a fuseweld powder such as a powdered metal composition of 94.6% nickel, 3.5% silicon and 1.9% boron. The fuseweld powder is applied to the inner diameter 34, or opening, of the tube. The mixture 32 may be applied by spraying or brushing. If subsequent processing steps are not performed immediately after the mixture 32 is applied, the adhesive portion of the mixture is permitted to cure prior to further processing as will be described below.

The mixture 32 may be applied by other methods and in other forms if subsequent processing steps are immediately performed. The mixture 32 may be applied by metered injection of dry powder, thick paste or gel.

Figure 3:
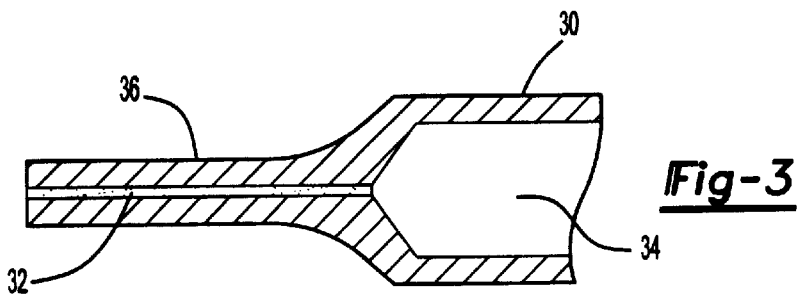
FIG. 3 is a fragmentary cross-sectional view of an end of a stabilizer bar that has been heated to melt the fuseweld powder and flattened.

Referring now to FIG. 3, an end of the stabilizer bar is shown with a flat end 36 formed by swaging the end of the tube 30 to close the end of the tube. The closed end of the tube is sealed by the fuseweld powder of mixture 32. The flattened end is formed when the tube has been heated and the fuseweld powder is either melted or at least in a plastic state. The thickness of the mixture 32 has been enlarged for illustrative purposes. The mixture 32 may be powdered metal and boron contained in an adhesive matrix. The boron functions as a flux agent and may be absorbed into the walls of the tube 30 to improve the adhesion of the fuseweld powder of the mixture 32 to the inner diameter 34 of the tube 30.

Figure 4:
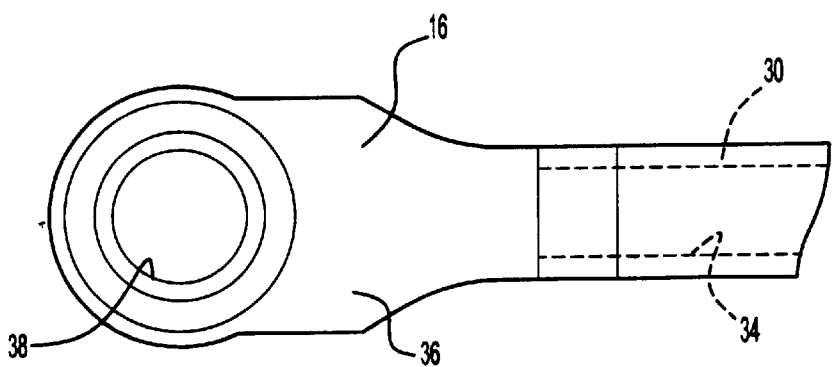
FIG. 4 is a fragmentary plan view of an end of a stabilizer bar that has been trimmed to form an eyelet for a fastener.

Referring now to FIG. 4, a fully formed right end 16 of the tube 30 is shown. The end 16 includes a fastener eyelet 38, or opening, that is formed through the flat end 36 of the tube 30. Since the inner diameter 34 of the tube is sealed when the opening 38 is formed through the flattened end 36, no leak path is provided from the fastener eyelet 38 to the inner diameter 34, or opening, in the tube 30. Hydraulic fluid is prevented from being drawn into the tube during quenching. Misalignment of the openings 38 in the walls of the tube 30 is also precluded.

Figure 5:
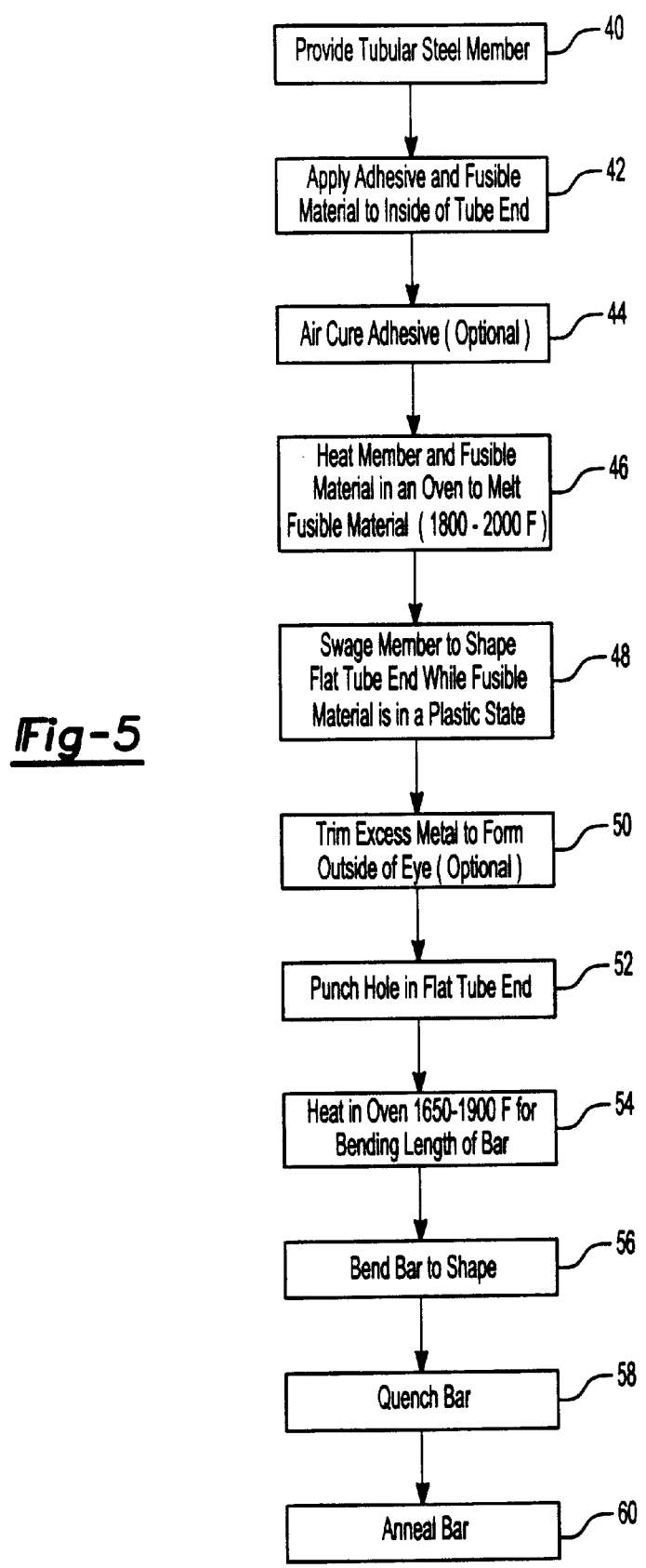
FIG. 5 is a flowchart showing the steps of the method of making a stabilizer bar according to the present invention.

Referring now to FIG. 5, the steps of the process or method of making a stabilizer bar for a vehicle are illustrated as steps on a flowchart. Initially, a tubular steel member is provided at 40. A mixture 32 of an adhesive and a fuseweld powder is applied to the inside of the tube end at 42. The fuseweld powder is preferably a powdered metal composition that includes a powdered metal that is compatible with the material of the tube 30 and also may include boron that facilitates bonding of the powdered metal to the tube 30.

Optionally, the adhesive is cured at room temperature or a somewhat elevated temperature at 44. After curing, the tubular steel member is heated in an oven to melt the fuseweld powder at 46. Depending upon the composition of the fuseweld powder and other process parameters, the oven temperature may be between 1800° F. and 2200° F.

The tubular member is then swagged at 48 to shape the end of the tubular member to form a flat tube end 36. The swaging operation is performed while the fuseweld powder is at a temperature high enough to keep the fuseweld powder in a plastic state. The fuseweld powder could also be in a molten state if desired.

Excess metal is optionally trimmed from the tubular member to form the outer periphery of the fastener eyelet at 50 if necessary to meet design requirements. A hole is punched, bored, or otherwise formed in the flattened tube end at 52. After the ends are formed, the tubular member is heated in an oven at 54 to prepare the tubular member for hot forming. Depending upon the composition of the tubular steel member, the oven is heated to a desired temperature of, for example, 1650° F.–1900° F.

The bar is bent to shape by a hot forming operation such as forging or bending in a hydraulic press at 56. At this point, the stabilizer bar is completely formed to shape and may, for example, be bent in a configuration such as the stabilizer bar 10 shown in FIG. 1.

After forming, the stabilizer bar is quenched at 58. The quench fluid may be an oil bath or an aqueous solution. The fuseweld powder seals the tube end and precludes any of the quench fluid from being drawn into the tube. As noted above, prior art stabilizer bars fabricated from tubular stock tend to draw the quenching solution into the tube because a vacuum is formed when the hot tube is placed in the quench bath. After the tube is quenched, it may form a martensitic structure that is too brittle for use as a stabilizer bar. Therefore, the stabilizer bar is annealed at 60 wherein the martensitic structure is converted to an austensitic structure to provide strength and durability. After the stabilizer bar is annealed, it is gaged for quality control and painted prior to installation on a vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a stabilizer bar for a vehicle comprising:

providing a steel tubular member having an inner diameter and two open ends;

applying a mixture of an adhesive and a fuseweld powder to the inner diameter of two ends of the tubular member;

heating the tubular member and the fuseweld powder to melt the fuseweld powder;

forming two ends of tubular member by flattening to form two flat ends while the fuseweld powder is heated to at least a temperature wherein the fuseweld powder is in a plastic state; and forming an eyelet in each of the two ends for a fastener.

2. The method of claim 1 wherein the step of applying the mixture of adhesive and fuseweld powder is followed by curing the adhesive.

3. The method of claim 2 wherein the fuseweld powder is a mixture comprising chromium, nickel, boron, silicon and molybdenum.

4. The method of claim 1 wherein the step of applying the mixture of adhesive and fuseweld powder is performed by brushing on the mixture.

5. The method of claim 1 wherein the step of applying the mixture of adhesive and fuseweld powder is performed by spraying on the mixture.

6. The method of claim 1 wherein the step of applying the mixture of adhesive and fuseweld powder is performed by metered injection in powder, paste or gel form.

7. The method of claim 1 wherein the step of heating the tubular member is performed in an oven that heats the tubular member to between 1800° F. and 2200° F.

8. The method of claim 1 wherein the step of forming the two ends to form two flat ends further comprises bonding the two ends together with the fuseweld powder sealing the two ends of the tubular member closed.

9. The method of claim 1 further comprising:

reheating the tubular member;

bending the tubular member along its length while heated;

quenching tubular member in a quenching fluid; and annealing tubular member.

10. The method of claim 9 wherein the step of reheating the tubular member comprises heating the tubular member to between 1650° F. and 1900° F.

11. The method of claim 9 wherein during the step of quenching the tubular member, the quenching fluid being oil and wherein the fuseweld powder seals the two ends of the tubular member to prevent the oil quenching fluid from being drawn into the tubular member.

* * * * *